United States Patent [19]
Becker et al.

[11] 3,868,403

[45] Feb. 25, 1975

[54] PROCESS FOR THE PRODUCTION OF HALOGEN-SUBSTITUTED AROMATIC AMINES

[75] Inventors: Hans-Joachim Becker; Helmut Dierichs; Walter Schmidt, all of Leverkusen, Germany

[73] Assignee: Bayer Aktiengesellschaft, Leverkusen, Germany

[22] Filed: July 19, 1971

[21] Appl. No.: 163,679

[30] Foreign Application Priority Data
July 22, 1970 Germany............................ 2036313

[52] U.S. Cl.......... 260/471 R, 260/518 A, 260/575, 260/580
[51] Int. Cl............................................ C07c 101/54
[58] Field of Search............ 260/518 A, 471 R, 575, 260/580

[56] References Cited
UNITED STATES PATENTS

| | | | |
|---|---|---|---|
| 3,073,865 | 1/1963 | Spiegler............................. | 260/580 |
| 3,356,728 | 12/1967 | Cimerol et al...................... | 260/580 |
| 3,356,729 | 12/1967 | Denton et al....................... | 260/580 |
| 3,359,315 | 12/1967 | Kosak................................. | 260/580 |
| 3,499,034 | 3/1970 | Gonzalez............................ | 260/580 |
| 3,517,063 | 6/1970 | Nason................................. | 260/580 |
| 3,666,813 | 5/1972 | Hindin et al....................... | 260/580 |

*Primary Examiner*—Lorraine A. Weinberger
*Assistant Examiner*—L. Arnold Thaxton
*Attorney, Agent, or Firm*—Burgess, Dinklage & Sprung

[57] ABSTRACT

Halogen substituted aromatic amines are prepared by reducing the corresponding nitro compounds at a temperature of from 80° – 130° C, under hydrogen pressure of from 10 – 150 atmospheres and at a pH of from 7 – 12 in an amount of watermisicible solvent sufficient to maintain a homogeneous phase during the reaction in the presence of from 1 to 25 percent by weight of a noble metal catalyst supported on active carbon, which catalyst has been used at least once in a catalytic hydrogenation reaction.

7 Claims, 1 Drawing Figure

PATENTED FEB 25 1975
3,868,403
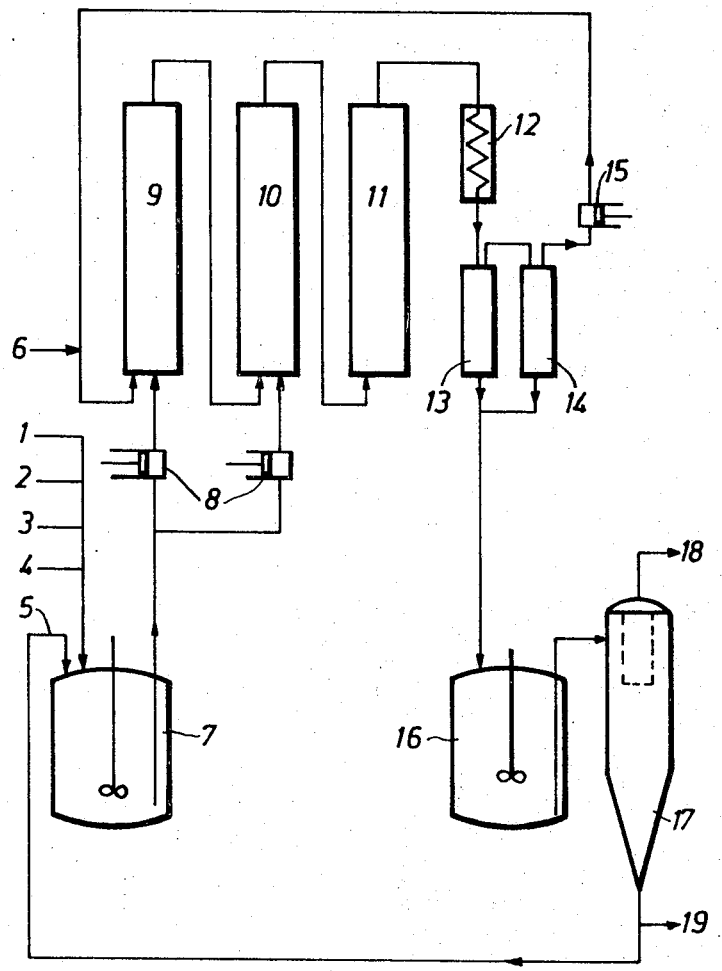
INVENTORS:
HANS JOACHIM BECKER, HELMUT DIERICHS, WALTER SCHMIDT.
BY
Burgess, Dinklage & Sprung
ATTORNEYS FOR APPLICANTS

PROCESS FOR THE PRODUCTION OF HALOGEN-SUBSTITUTED AROMATIC AMINES

BACKGROUND

This invention relates to the preparation of halogen substituted aromatic amines from the corresponding nitro compounds by reduction in the presence of a noble metal catalyst which has been previously used for catalytic hydrogenation.

There are numerous processes for the production of chlorinated anilines by the catalytic reduction of corresponding nitro compounds. In general, these processes employ the same catalysts as are used in the production of chlorine-free compounds, for example nickel on a support or in the form of Raney nickel, or noble metals, such as platinum and palladium supported on carbon, alumina or kieselguhr.

Thus, U.S. Pat. No. 3,067,253 refers to Raney Nickel, whilst U.S. Pat. No. 3,148,217 refers to Raney nickel and nickel on kieselguhr or on aluminium oxide. Platinum, paladium and rhodium on carbon and alumina are mentioned in U.S. Pat. Nos. 3,149,161 and 3,073,865.

In the processes described in these Patents, attempts are made to suppress dehalogenation by relatively mild reaction conditions such as low temperatures and/or low hydrogen pressures. U.S. Pat. No. 3,350,452 is directed, in particular, to a reaction carried out at room temperature and atmospheric pressure. In addition, the concentration of the catalyst is frequently kept very low in order to reduce the extent of dehalogenation. Unfortunately, this necessitates reaction times of many hours, even with laboratory-scale batches. Accordingly, these processes are of little or no use for large-scale working.

It has also been proposed to improve the known processes by using dehalogenation inhibitors. Unfortunately, these processes require equally long reaction times.

In addition, it is difficult and time consuming under mild conditions to completely hydrogenate the nitro compound. The reaction products are frequently coloured and contain secondary products, such as hydrazo compounds.

Accordingly, conventional processes do not allow reduction to be carried out economically and satisfactorily on a large scale.

SUMMARY

It has now surprisingly been found that halogen-substituted aromatio amines can now be obtained in short reaction times, high yields and highly pure form by reducing corresponding nitro compounds under thhe influence of a basically acting alkaline earth compound at a pH value of from 7 to 12 in the presence of such a quantity of a water-miscible solvent that a homogeneous phase (apart from catalyst and alkali metal compound) is present throughout the entire duration of the reaction and in the presence of from 1 to 25 % by weight of a noble metal catalyst, supported on active carbon, having a metal content of from 0.1 to 5% by weight and which has already been used at least once in a catalytic hydrogenation reaction, at a temperature of from 80° to 130° C and under a hydrogen pressure of from 10 to 150 atms.

DESCRIPTION OF THE DRAWING

The drawing is a schematic flow diagram of a preferred embodiment of the invention wherein the process is carried out continuously.

DESCRIPTION

Preferred nitro compounds correspond to the formula

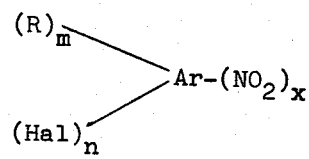

in which
Ar represents a benzene or naphthalene ring,
Hal represents fluorine, chlorine or bromine,
R represents hydrogen, alkyl with 1 to 4 carbon atoms, alkoxy with 1 to 4 carbon atoms, carboxy, alkoxycarbonyl with 1 to 6 carbon atoms, phenyl, hydroxyl or benzyl,
$x$ represents 1 or 2, and
$m$ represents 1 or 2, the total of $x$, $m$ and $n$ together being at most 6.

Examples of nitrohalogen compounds used in the process according to the invention include 4-chloronitrobenzene; 4-chloro-4-nitrotoluene; 4-chloro-2-nitro-1,3-dimethylbenzene; 4-fluoronitrobenzene; 4-bromonitrobenzene; 3,4-dichloronitrobenzene; 2,3,4-trichloronitrobenzene; 3,4-dibromonitrobenzene; 3-chloro-4-bromonitrobenzene; 2,6-dichloro-4-nitrophenol; 4-chloro-2-nitroanisole; 4-chloro-1-nitronaphthalene; 4-chloro-2,6-dinitrobenzene; 4-chloro-3,5-dinitrobenzoic acid or an ester thereof; 3-chloro-3'-nitrodiphenyl; or 2-chloro-4-nitroaniline.

It is of course also possible to use isomers and mixtures of the aforementioned compounds.

The process according to the invention is carried out at a temperature of from 80° to 130° C., preferably at a temperature of from 100° to 110° C., under a hydrogen pressure of from 10 to 150 atms., preferably from 80 to 100 atms. In general, it has proved to be best to adapt the temperature and pressure to one another in such a way that the shortest possible reaction time is obtained.

Examples of water-miscible solvents suitable for use in the process according to the invention include methanol, ethanol, isopropanol and alcohol/water mixtures, for example isopropanol/water mixtures (water content from 12 to about 20% by weight), preferably the azeotrope (water content 12.6% by weight). The quantity of solvent employed is such that a homogeneous mixture is present throughout the entire duration of the reaction. Isopropanol, or a mixture of isopropanol and water, is particularly preferred for the process according to the invention.

In addition to palladium, platinum is preferably used as the noble metal catalyst supported on carbon employed in the process according to the invention. The catalyst has a noble metal content of from 0.1 to 5% by weight, more particularly from 0.2 to 1% by weight. When required, the optimum noble metal concentration can readily be determined in a non-continuous laboratory test.

The process according to the invention can of course be carried out either continuously or in batches. If the process according to the invention is to be successfully carried out, it is essential to use a catalyst having a predetermined level of activity through having been previously used at least once and preferably several times. It has been found that a catalyst that has been used once forms only half the quantity of secondary products obtained when employing an unused catalyst. After three to five prior uses, the quantity of dehalogenated secondary products falls to from 10 to 20 % of the quantity obtained when an unused catalyst is employed, as is demonstrated by the tests described in the Examples.

The catalyst can generally be re-used several times giving consistently good results; see, for example, the used catalyst of the B-series employed in Examples 1 and 2 below.

The already used catalyst can have been obtained either from the same reaction, or from a different reduction, or even from a totally different type of hydrogenation. By selecting a catalyst having a predetermined activity, which is determined by its previous use and which can readily be determined by preliminary tests, it is possible in principle to produce any amine from the corresponding nitro compound with only minimal dehalogenation products or other secondary products.

In addition, the activity of the catalyst employed in the process can be kept constant at the required level and controlled by the alternating or continuous addition of small quantities of a somewhat less active catalyst. Since the quantity added is negligible, it is also possible for regeneration to be carried out with fresh, hitherto unused catalyst without any appreciable reduction in the quality of the end product.

The process according to the invention is particularly suitable for continuous working. In this embodiment, the catalyst coming from the hydrogenation stage is directly returned for the preparation of fresh hydrogenation mixture. There is no need for it to be completely separated from the amine formed. The catalyst can be directly re-used in the form of a suspension in the completed reaction solution.

The high catalyst concentrations required to obtain short residence times is several times greater than that employed in conventional processes. The high catalyst concentration is crucial to the process according to the invention. In general, it is from approximately 1 to 25% by weight, preferably from 4 to 20% by weight, and, when the process is carried out continuously, preferably from 10 to 20% by weight of effective catalyst (i.e. noble metal + carbon) corresponding to from 0.01 to 1.0% by weight, for example, of platinum, based on the nitro compound used. The upper limit to the concentration is not critical. The quantity freshly added, and hence the effective consumption of catalyst, is extremely small. It is from about 0.1 to 0.01% by weight.

Another feature of crucial importance to the success of the process according to the invention is working at a pH value in the range from about 7 to 12, preferably in the range from 8 to 10.5. The pH value is adjusted by the addition of a basically acting alkaline earth metal compound, for example an alkaline earth metal hydroxide, oxide, carbonate, or alcoholate. Calcium is preferably used as the alkaline earth metal, calcium hydroxide being particularly preferred, in a quantity of from 0.05 to 0.3% by weight, preferably 0.1 to 0.2% by weight, based on the nitro compound. In general, there is no harm in using an excess of up to about 30% of calcium hydroxide, because only the soluble component affects the pH value of the solution, whilst the undissolved component, which is recycled with the catalyst, represents a reserve that corrects possible fluctuations in the pH value.

The process according to the invention is eminently suitable for continuous working. Examples of compounds preferably used for the process include p-chloronitrobenzene, m-chloronitrobenzene, o-chloronitrobenzene, 2,5-dichloronitrobenzene and, in particular, 3,4-dichloronitrobenzene.

In view of the prior art, it must be regarded as extremely surprising that, in spite of the high catalyst concentration, the high temperature and the high hydrogen pressure, hardly any halogen is split off in the process according to the invention, an amine free from starting material (e.g. nitro compound) and secondary products (e.g. hydrazo compound) being obtained in a substantially quantitative yield and in short reaction times.

The amines obtainable by the process according to the invention are important intermediate products for the production of isocyanates and plant-protection agents.

EXAMPLE 1

One hundred parts by weight of 3,4-dichloronitrobenzene, 200 parts by weight of isopropanol/water azeotrope, 0.1 part by weight of calcium hydroxide and 4 parts by weight of a 1% by weight platinum catalyst on carbon, suspended in 100 parts by weight of isopropanol/water azeotrope, are introduced into an autoclave equipped with stirring mechanism. Reduction is carried out under a hydrogen pressure of 100 atms. and at a temperature beginning from the point at which reduction starts up to a maximum of 100° C. On completion of reduction; followed by cooling, the product is decanted off from the catalyst and filtered. For the second and subsequent reductions, the separated catalyst is used in suspension in 100 parts by weight of the end product solution from the preceding test with 100 parts by weight of 3,4-dichloronitrobenzene, 200 parts by weight of isopropanol/water azeotrope and 0.1 part by weight of calcium hydroxide. The following results are obtained.

The used catalyst of the B-series is obtained from the production of 3,4-dichloroaniline in accordance with the Example given below to illustrate the continuous procedure (Example 5).

EXAMPLE 2

|   |   | Duration in mins. | de-chlorinated or relatively low-boiling products (%) | higher-boiling products (%) |
|---|---|---|---|---|
| A Fresh catalyst 1% of Pt on carbon | 1st test | 7 | 2.47 | 0.75 |
|  | 2nd do. | 7 | 1.26 | 0.36 |
|  | 3rd do. | 7 | 0.68 | 0.18 |
|  | 4th do. | 7 | 0.37 | 0.06 |
|  | 5th do. | 7 | 0.17 | 0.03 |
|  | 6th do. | 9 | 0.17 | 0.01 |
| B Used catalyst 1% of Pt on carbon | 1st do. | 17 | 0.09 | 0.05 |
|  | 2nd do. | 19 | 0.09 | — |
|  | 3rd do. | 19 | 0.09 | — |
|  | 4th do. | 22 | 0.09 | — |
|  | 5th do. | 29 | 0.08 | — |
|  | 6th do. | 29 | 0.07 | — |

EXAMPLE 3

The following results are obtained in accordance with Example 1 using 4-chloronitrobenzene:

|  |  | Duration in mins. | de-chlorinated or relatively low-boiling products (%) | higher-boiling products % |
|---|---|---|---|---|
| A Fresh catalyst | 1st test | 8 | 8.56% | 0.58% |
| 1% Pt on carbon | 2nd do. | 9 | 3.28% | 0.36% |
|  | 3rd do. | 10 | 1.21% | 0.10% |
|  | 4th do. | 11 | 0.76% | 0.06% |
|  | 5th do. | 11 | 0.61% | 0.07% |
|  | 6th do. | 12 | 0.42% | 0.06% |
| B Used catalyst | 1st test | 14 | 0.39% | 0.12% |
| 1% Pt on carbon | 2nd do. | 17 | 0.36% | 0.06% |
|  | 3rd do. | 26 | 0.20% | 0.02% |
|  | 4th do. | 30 | 0.20% | 0.03% |

EXAMPLE 4

The same effect can also be observed when 4-bromonitrobenzene is hydrogenated:

|  | Duration in mins. | de-chlorinated or relatively low-boiling products | higher-boiling products |
|---|---|---|---|
| A Fresh catalyst 1% Pt on carbon | 6 | 9.45% | 1.22% |
| B Used catalyst 1% Pt on carbon | 25 | 0.68% | 0.79% |

EXAMPLE 5

Continuous procedure (for reference numerals see accompanying Drawing).

The hydrogenation apparatus used comprises one or more tubular reactors (9, 10, 11) arranged in series, being provided with cooling tubes in order to dissipate the heat of reaction, a product condenser (12), separators (13 and 14) and a gas circulating pump (15) to recirculate hydrogen.

The hydrogenation mixture is made up in a vessel (7) from a chloronitro compound (1) to be hydrogenated, a solvent (2), "fresh catalyst" (3) added as and when necessary, an additive for adjusting the pH value, for example lime (4), and recycled catalyst (5) suspended in the amine/water/ solvent mixture. The mixture is then delivered by means of high pressure pumps (8) into the reactor (9) or, when a multiple-reactor system is used, into all reactors except for the last reactor, and reacted therein with hydrogen (6) which is introduced into the reactor (9) together with the recycled hydrogen. The heat of reaction is dissipated by cooling water. The product leaving the reactors is cooled in the condenser (12) and separated off in the separators (13 and 14) from the gas phase which is returned to the first reactor by means of the recirculating pump (15). The amine solution discharged from the high-pressure zone by means of regulating valves is de-gassed in a vessel (16) and then freed from the catalyst/lime mixture in a filter (17). It is then worked up in (18). The catalyst, together with the residual lime, is returned to the next hydrogenation batch in the vessel (7) in suspension in the end product/water of reaction/solvent mixture.

Some of this suspension can be removed from the circuit at (19) in an amount corresponding to the input of fresh catalyst, and worked up.

1250 kg/hour of commerical 3,4-dichloronitrobenzene (isomer content 0.6 - 0.8% by weight), 2,500 kg/h of isopropanol/water azeotrope (i.e. water content approximately 13% by weight), 600 g/h of fresh i.e. unused catalyst (1% of platinum on carbon), 1.25 kg/h of calcium hydroxide and 1250 kg/h of catalyst-containing end product solution, are continuously pumped into the first reactor of a system comprising a main reactor and a secondary reactor. The catalyst-containing end product solution has substantially the following composition:

24.5% by weight of 3,4-dichloroaniline,
50% by weight of isopropanol,
13.5% by weight of water,
11% by weight of catalyst, and
1% by weight of lime.

The hydrogen pressure is kept at 100 atms. and the temperature at 105° to 110° C. by means of cooling water. The product issuing from the first reactor is completely reacted and free from nitro compound. The residence time in the first reactor is about 6 to 8 minutes.

The completed amine solution should have a pH value of from 8 to 10.5. The quantity of calcium hydroxide added per hour is increased or reduced correspondingly to the change taking place in the pH value.

The quantity of used catalyst corresponding to the quantity of fresh catalyst added is removed from the circuit once daily, worked up and tested to assess its serviceability.

The isopropanol/water mixture recovered by distillation can be re-used without purification. The crude substantially colourless 3,4-dichloroaniline (yield 99% of the theoretical) freed from water has a solidification point of 71.2° to 71.3°C. It is further processed without further purification. The product contains approximately 0.05% of p-chloroaniline, less than 0.05% of m-chloroaniline and less than 0.05% of aniline. It is free from nitro compound and hydrazo compound.

What we claim is:

1. In a process for preparing halogen substituted aromatic amines from the corresponding nitro compounds by hydrogen reduction in the presence of a noble metal catalyst the improvement which consists essentially of carrying out said reduction at a pH of from 7-12 in the presence of a noble metal catalyst having a metal content of from 0.1 to 5% by weight and a predetermined level of activity through having been previously used at least once in a catalytic hydrogenation reaction, said previously used catalyst producing said halogen substituted aromatic amines in substantially quantitative yield with substantially no dehalogenation and the formation of substantially no secondary products as compared to the same fresh noble metal catalyst.

2. Process of claim 1 wherein said nitro compound has the formula

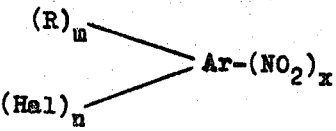

wherein
   Ar is benzene or naphthalene;
   Hal is fluorine, chlorine or bromine;
   R is hydrogen, alkyl with 1 to 4 carbon atoms, alkoxy with 1 - 4 carbon atoms, carboxy, alkoxycarbonyl with 1 to 6 carbon atoms, phenyl, hydroxyl or benzyl;
   $x$ is 1 or 2;
   $m$ is 1 or 2; and
   $n$ is a whole number and the total of $x$, $m$ and $n$ and does not exceed 6.

3. Process of claim 1 wherein said nitro compound is selected from the group of 4-chloronitrobenzene; 4-chloronitrotoluene; 4-chloro-2-nitro-1,3-dimethylbenzene; 4-fluoronitrobenzene; 4-bromonitrobenzene; 3,4-dichloronitrobenzene; 2,3,4-trichloronitrobenzene; 3,4-dibromonitrobenzene; 3-chloro-4-bromonitrobenzene; 2,6-dichloro-4-nitrophenol; 4-chloro-2-nitroanisole; 4-chloro-1-nitronaphthalene; 4-chloro-2,6-dinitrobenzene; 4-chloro-3,5-dinitrobenzoic acid or an ester thereof; 3-chloro-3'-nitrodiphenyl; and 2-chloro-4-nitroaniline.

4. Process of claim 1 wherein the hydrogen reduction is carried out at a temperature of from 80° to 130°C under a hydrogen pressure of from 10 to 150 atmospheres in an amount of a water-miscible solvent sufficient to maintain the nitro compounds and the amines formed in the homogeneous phase throughout the reaction, said catalyst being supported on active carbon and having a metal content of 0.1 to 5% by weight and being used in an amount of from 1 to 25% by weight.

5. Process of claim 4 wherein said temperature is from 100°–110° C and said hydrogen pressure is from 80 – 100 atmospheres.

6. Process of claim 4 is carried out continuously.

7. Process of claim 4 wherein said solvent is a mixture of isopropanol and water.

* * * * *